United States Patent [19]
Coran et al.

[11] 3,767,505
[45] Oct. 23, 1973

[54] PRODUCING ORDERED COMPOSITES BY APPLICATION OF MAGNETIC FORCES

[75] Inventors: Aubert Y. Coran, Akron; Larry R. Swaney, Wadsworth, both of Ohio

[73] Assignee: Monsanto Company, St. Louis, Mo.

[22] Filed: Feb. 19, 1971

[21] Appl. No.: 117,019

[52] U.S. Cl.............. 156/276, 117/17, 161/165, 161/170, 264/24, 264/108
[51] Int. Cl............................................. B32b 31/12
[58] Field of Search.................... 117/17; 156/276, 156/279; 161/165, 169, 170; 264/24, 108

[56] References Cited
UNITED STATES PATENTS

| | | | |
|---|---|---|---|
| 3,128,544 | 4/1964 | Allingham | 264/24 X |
| 3,121,131 | 2/1964 | Blume | 264/104 |
| 3,676,253 | 7/1972 | Cox | 156/279 |

*Primary Examiner*—Alfred L. Leavitt
*Assistant Examiner*—Robert A. Dawson
*Attorney*—Richard O. Zerbe, Larry R. Swaney and Neal E. Willis

[57] ABSTRACT

Composites comprising discontinuous elements in ordered disposition in a matrix are prepared by the application of magnetic forces.

11 Claims, 8 Drawing Figures

SECTION A-A

PRODUCING ORDERED COMPOSITES BY APPLICATION OF MAGNETIC FORCES

The invention relates to composites comprising discontinuous elements distributed throughout a matrix. More particularly it relates to composites reinforced with discontinuous fiber or other discontinuous reinforcing material in ordered disposition which order is achieved by magnetic means.

BACKGROUND OF THE INVENTION

The ordered disposition of discontinuous elements in a matrix is often desired for decorative or strictly utilitarian purposes. A known method for magnetic orientation of fibers comprises dispersing magnetic fibers in a hardenable material, imposing a single pole of a magnetic field upon the composite to align the fibers and allowing the matrix to harden thereby fixing the fibers in the position established magnetically. A shortcoming of this method is that the composite must remain in the magnetic field a substantial period of time to allow the matrix to set. Additionally, the procedure is not applicable to matrixes of high viscosity, such as vulcanizable elastomers, since the magnetic forces cannot overcome the resistance to movement of the fibers in the viscous medium. Mechanical methods are known for making oriented fiber reinforced matrixes but produce composites wherein the fibers, although directionally oriented, are otherwise randomly spaced throughout the matrix and mechanical methods are not capable of providing composites with uniform spacing between fibers in a predetermined pattern. By the present invention it is possible to produce regularly spaced oriented fiber reinforced composites.

SUMMARY OF THE INVENTION

According to this invention, magnetic discontinuous material in the form of fiber, plates or other suitable form is reduced to spatial order by the force of a magnetic field, for example, by introducing the material in controlled amount to a magnetic field between the poles thereof to effect an ordered disposition of the individual elements of the magnetic material which order may be predetermined by the nature of the field as hereinafter explained and the ordered material is contacted with the matrix surface and maintained in the same ordered disposition in the matrix. Layers may be built up as desired. A suitable matrix material for the composite may provide an adhesive surface to transfer the discontinuous material between the poles of the magnet to the matrix so that the position of the elements remains intact. The transfer agent will ordinarily have an adhesive attraction for the reinforcing material greater than the magnetic attraction of the discontinuous material to the magnetiic field and the tackiness will ordinarily be sufficient to maintain the position of the elements. Composites reinforced with fibers in any of the directions parallel to the surface of the matrix can be produced. A plurality of magnetic fields may be used to provide a predetermined pattern for the arrangement of the elements. Any desired arrangement may be achieved by varying the placement of the individual magnets in a purality of magnetic fields.

DESCRIPTION OF THE DRAWINGS

FIG. 4b illustrates a laminate of the composite shown in 4a.

Description of Preferred Embodiments

Figure 1:
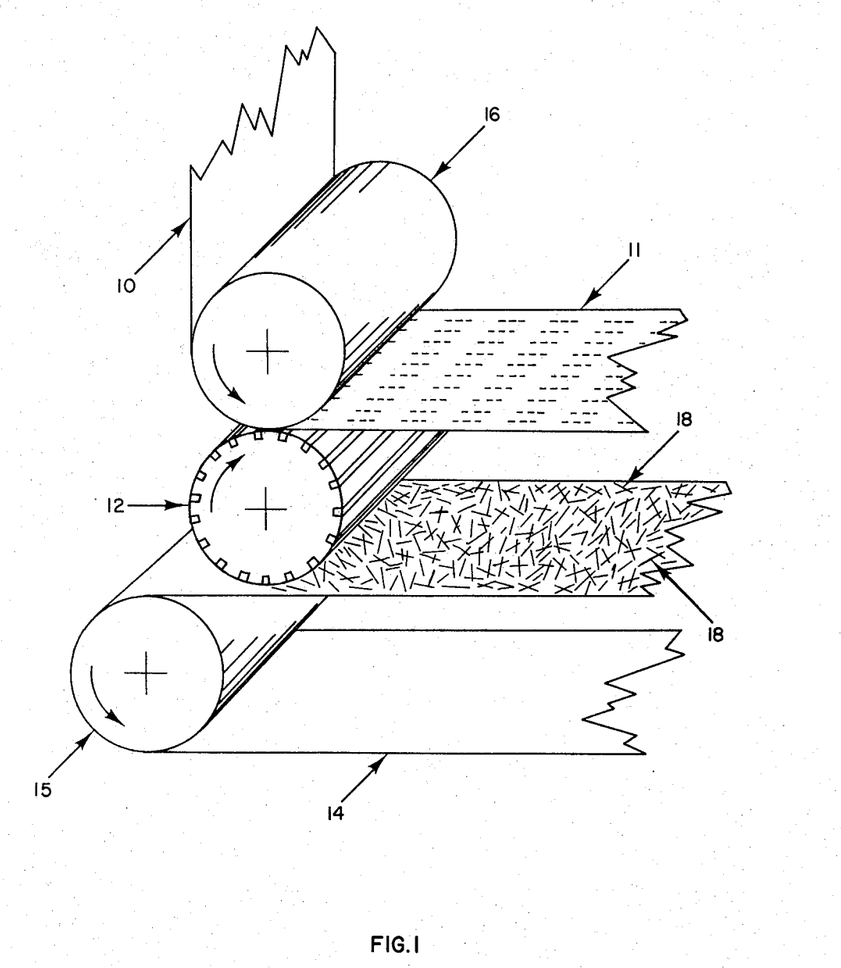
FIG. 1 illustrates an embodiment of the invention wherein a controlled amount of a monolayer of randomly dispersed magnetic fiber on a belt is picked up by a cylinder containing a plurality of magnets and transferred to a matrix.

Referring to FIG. 1, the embodiment of the invention illustrated thereby provides for the continuous preparation of composites. Rolls 12 and 16 rotate in opposite directions of which roll 16 is a conventional roll while roll 12 contains a plurality of magnets as shown in more detail in FIG. 2 to provide a plurality of band-like magnetic fields. A sheet of matrix material 10 is fed between the nip of rolls 12 and 16 and as the rolls rotate, the sheet advances through the nip and exits on the other side. A supply of magnetic fibers 18 randomly dispersed in essentially a monolayer on a sheet of material 14 contacts roll 12 as sheet 14 advances toward roll 15. As roll 12 revolves and contacts the supply of fibers, it removes the fibers from sheet 14 due to the magnetic field and orients a number of fibers within each band-like magnetic field. The amount of fiber on sheet 14 and the strength of the magnetic field determine the number and the spacing of each fiber within the field for each band. As roll 12 revolves it transports oriented fibers to the surface of the sheet 10 at the point between the rolls. The fibers upon contacting the sheet between the rolls are impressed into the sheet whereupon the adhesive property of the sheet material sticks the fibers to the sheet with sufficient force that upon exit the fibers remain attached to the sheet forming composite 11, the disposed fibers being shown by phantom lines. The belt 14 free of fiber returns to the fiber supply to repeat the process just detailed.

Figure 2:
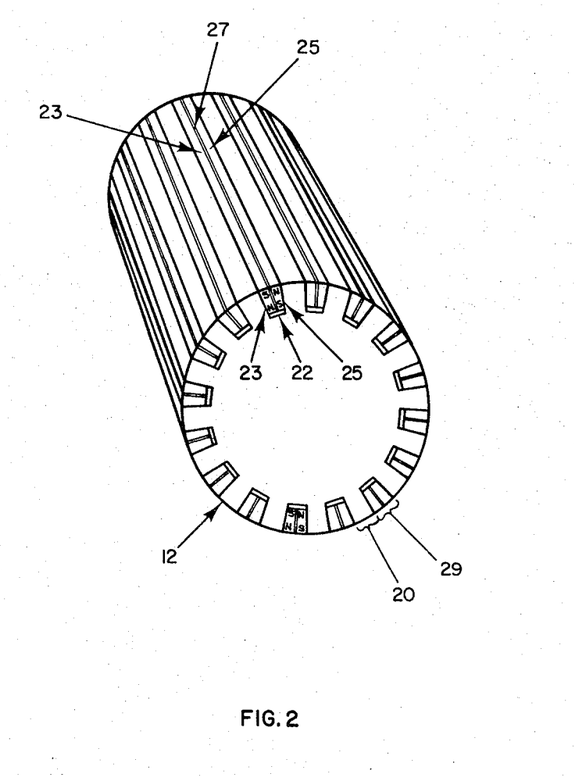
FIG. 2 is an enlarged view of a cylinder containing magnets.

Referring to FIG. 2, cylinder 12 is made of a nonmagnetic material having a series of axially spaced permanent magnets extended longitudinally along the cylinder wall. The cylinder may be constructed to permit the magnets to extend through the cylinder wall and become a part of the cylinder's outer surface. Alternatively, the wall of the cylinder may be continuous and the magnets secured in the internal surface of the cylinder. The magnetic strips are constructed by joining two permanent magnets 23 and 25 which are placed so that north pole of magnet 25 and the south pole of magnet 23 is adjacent to the perimeter of the cylinder. A strip of non-magnetic material 27 separates the two magnets thereby forming a magnetic field 29 running from magnet 23 to magnet 25. The interpolar distance of the magnetic field, hereinafter referred to as length of magnetic field, can be varied by varying the thickness of strip 27 separating the two magnets. Although not essential, it is preferable to provide a magnetic circuit by affixing a strip of ferromagnetic material 22 to the opposite poles of permanent magnets 23 and 25. The strip of alternatively poled magnets just described is separated from the adjacent strip of alternatively poled magnets by space 20. Space 20 may be varied according to the distance between rows of oriented fibers desired in the finished product.

Figure 3:
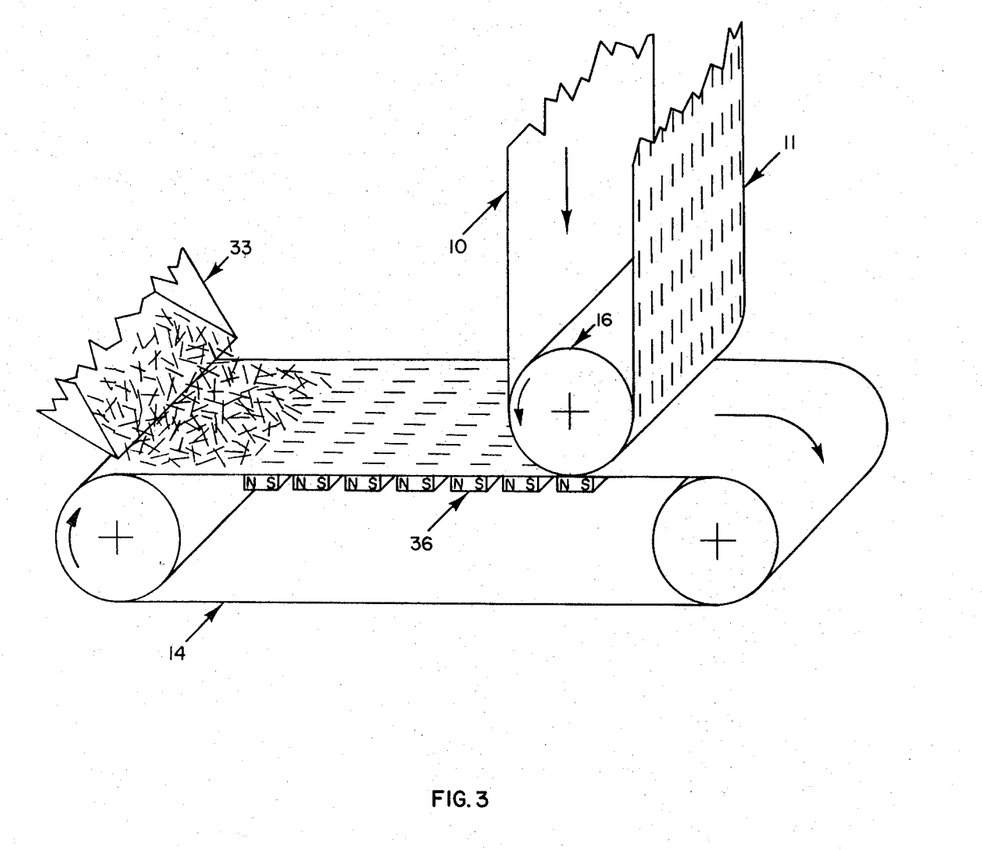
FIG. 3 illustrates an embodiment of the invention wherein a controlled amount of a monolayer of randomly dispersed uniform length magnetic fiber on a belt is passed over a series of stationary magnets and transferred from the belt to a matrix surface.

In another embodiment of the invention illustrated by FIG. 3, a controlled amount of fiber is fed via feeding means 33 to belt 14 which carries the disoriented fibers over a plurality of parallel magnetic fields 36 which orient and space the fibers. The plurality of magnetic fields 36 may be provided by a series of magnets as in the cylinder of FIG. 2 but in a planar arrangement. The regularly spaced and oriented fibers, while still in the magnetic field, contact maxtrix material 10 passing around roll 16. It will be appreciated that the strength of the magnetic field must be sufficiently strong to effect the orientation but weak enough to permit advance of the oriented spaced fibers across the magnets to roll 16. The pressure of roll 16 as well as the adhesive properties of matrix 10 are adjusted to provide adequate matrix to fiber attraction to transfer the fibers from the magnetic field to the matrix. Composite 11 composed of oriented regularly spaced fibers attached to the matrix leaves on the opposite side of the roll.

Figure 4A:
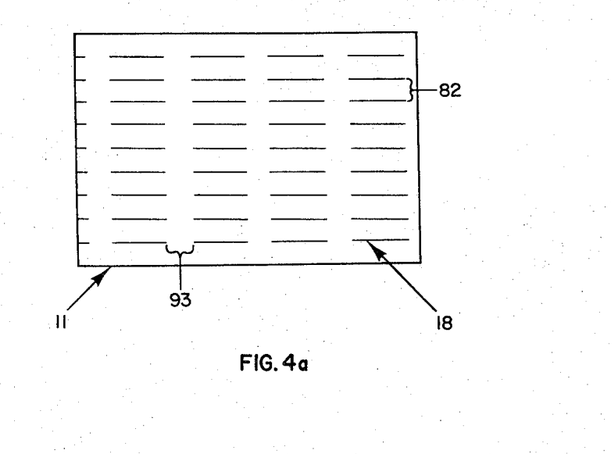
FIG. 4a shows a composite of regularly spaced oriented fibers disposed upon a sheet of matrix material.

The ordered arrangement of composite 11 is shown in detail by FIG. 4a which shows the regularly spaced fibers arranged in rows adhered to matrix material. Each discrete fiber 18 is spaced distance 82 from its neighbor in the same row. Distance 82 is variable depending upon the strength of magnetic field, the magnetic susceptibility of the fiber and the amount of fiber or additionally distance 82 may be controlled by spatial disposition of magnets lateral to the direction of orientation. Approximately equal spacing between fibers can be obtained while controlling the space 93 between each row of fibers. Also, all of the fibers lie within the same plane in the matrix which permits building laminates in which the fiber spacing is controlled to give desirable reinforcement properties to the matrix in the longitudinal direction as hereinafter explained. The aforesaid features are important advantages of the invention.

The pattern of spacing illustrated in FIG. 4a may be obtained by orienting fibers in a single magnetic field and then contacting the oriented fibers with an adhesive matrix, removing the matrix having a single row of fibers attached thereto from the magnetic field, orienting another row of fibers, advancing the matrix to provide whatever distance between rows of fiber is desired and again contacting the fibers with the matrix and removing them from the field. This process is repeated any number of times to produce any sized composite. Preferably the fibers are oriented in a plurality of magnetic fields as previously described and then contacted with an adhesive body to obtain a composite having a plurality of rows of fibers attached thereto. The spacing between rows is determined by the spacing between the individual magnetic fields. Since the space 82 between each fiber is dependent upon the strength of the magnetic field and amount of fibers in the magnetic field, many desired spacings may be obtained through varying the aforesaid parameters.

Figure 4B:
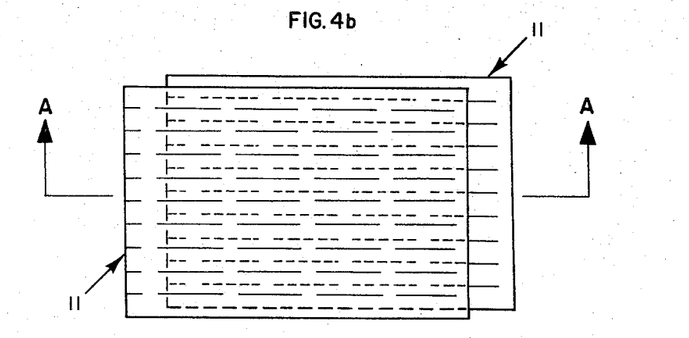
Figure 4C:
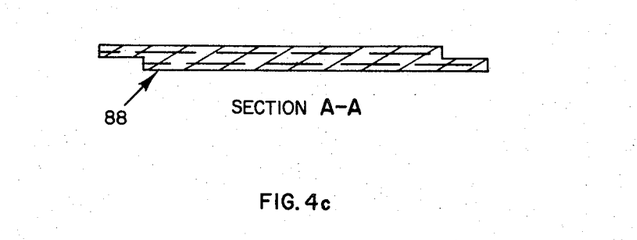
FIG. 4c is a cross section view along A—A of FIG. 4b.

FIG. 4b shows a possible fiber arrangement in a laminate formed from two or more single composite bodies 11 to attain enhanced reinforcement properties in the longitudinal direction. The solid lines represent fibers in the top layer and the phantom lines represent fibers in the layer immediately beneath the top layer. A side view of the laminate shows the offsetting arrangement of fibers in adjacent layers in FIG. 4c which is section A—A of 4b. The uniform spacing shown for purposes of illustration is not the only arrangement possible but many different arrangements may be obtained by offsetting each layer of the laminate, by varying the spacing between the rows of the fibers and by changing the space between each fiber.

Figure 5A:
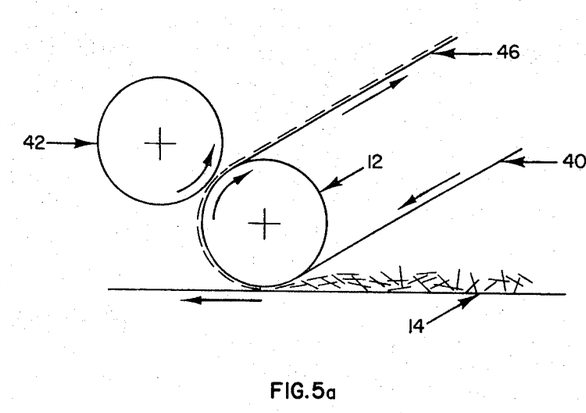
FIG. 5a illustrates an embodiment of the invention wherein a supply of randomly dispersed magnetic fiber on a belt is transferred to a matrix on a cylinder containing a plurality of magnets.

In another embodiment of the invention illustrated by FIG. 5a, matrix material 40 in the form of a belt passes around cylinder 12 containing a plurality of magnets as explained above. A controlled supply (essentially a monolayer) of randomly arranged magnetic fibers is passed in close proximity to, but without touching, the matrix material. The force of the magnetic fields of cylinder 12 simultaneously withdraws and orients the fiber directly upon the matrix. Composite 46 exits on the opposite side of roll 12. Auxiliary roll 42 may be supplied to exert sufficient pressure upon the fiber while still in the magnetic field to force the fiber into the matrix and thereby increase adhesion. Using the auxiliary roll is particularly advantageous when the matrix material is deficient or totally lacking in surface tack because embedding the fibers into the matrix with the rolls enables the fibers to be transported out of the magnetic field without displacement. An advantage of this embodiment is that an excess of fibers may be supplied and the number of fibers attracted by the magnetic field is then fairly constant which improves the uniformity of space between fibers. Excess fibers remaining on belt 14 are recovered and recycled.

Figure 5B:
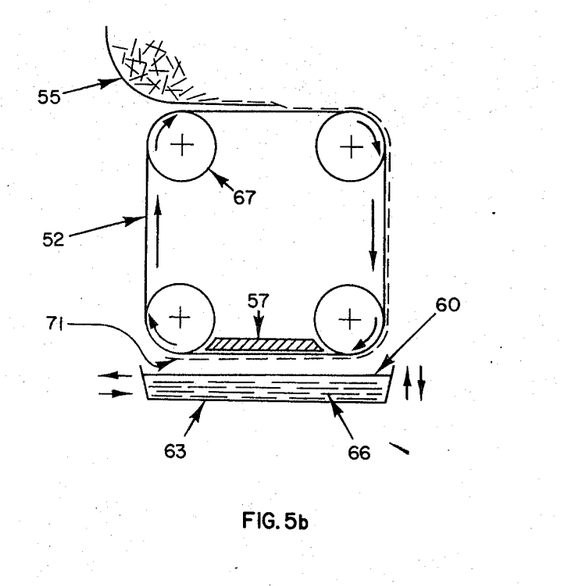
FIG. 5b illustrates an embodiment of the invention wherein a monolayer of randomly dispersed magnetic fiber by controlled action of gravity and magnetic field is fed to a series of movable magnets in the form of a belt from which the fiber is transferred by reciprocating action of a matrix surface.

In the embodiment in which multilayer laminates are built up through reciprocating action of a matrix surface illustrated by FIG. 5b, a plurality of magnetic fields in which the magnets are in the form of a movable flexible belt 52 are passed over four wheels or rolls 67. Magnetic fibers are fed to non-magnetic support 55 which is the width of belt 52 and has a lip which extends parallel or nearly parallel over the belt for some distance. As belt 52 passes under the lip of 55 the magnetic forces of the magnetic fields carry the fibers toward the edge of the support and at the same time orient and space them. The fibers advance to the edge of the support where they drop off while maintaining their oriented and spaced disposition. The belt 52 advances carrying the fibers to position 71 where the belt is temporarily stopped while support 63 is raised contacting matrix material 60 with the fibers. Stationary support 57 supports belt 52 during contact to provide uniform contact between the matrix and the belt. Support 63 is withdrawn carrying with it matrix 60 with oriented spaced fiber embedded therein. The belt and support 63 are mechanically or electrically interlocked so that as support 63 is withdrawn, belt 52 advances carrying fibers to position 71 to repeat the procedure. During the interim period while 63 is withdrawn, another layer of matrix material 60 is provided. A means is provided to move laterally support 63 on each cycle so as to offset the previous composite from the position of the oriented fibers in the belt so that the next composite forms wherein the fibers are offset from the previously formed composite. As the procedure is repeated, a multilayer laminate 66 is produced. Matrix material 60 may be in the form of a thin sheet, for example, a preformed vulcanizable elastomeric composition or thermosetting resin, a sheet of which is formed in situ by spraying. The adhesive properties of the matrix material must be such that the attraction between itself and the fiber is greater than the attraction of the matrix and the belt.

Belt 52 comprises a plurality of magnetic fields provided, for example, by a number of magnets arranged as in FIG. 3 but securely attached to a flexible belt such as a rubber belt. Alternately, belt 52 may be formed by dispersing permanently magnetizable material in a matrix and magnetizing to form band-like poles across the belt. For example, barium ferrite may be dispersed in a matrix such as vinyl chloride or rubber, the material calendered into sheets, and the sheet magnetized as described in U.S. Pat. No. 3,127,544. Such a magnetized sheet may be substituted for the magnets to provide the magnetic field 36 of FIG. 3; similarly, a cylinder covered with the aforesaid magnetized sheet may be substituted for cylinder 12 of FIGS. 1, 2 and 5a.

Another embodiment of the invention comprises dropping a controlled amount of fiber directly upon a magnet or a plurality of magnetic fields prior to transferring the arranged fiber to the matrix. Generally, when using this method it is advisable to vibrate the magnet or magnetic fields since vibration facilitates proper distribution of the fiber.

Certain dimensional relationships between the magnetic field and fibers are preferred. The fiber length may exceed the distance between the poles of the magnetic field providing no other magnetic fields are in proximity which will interfere with the fiber arrangement. Generally, it is better to use fibers which do not exceed three times the length of the magnetic field. Although the fibers may be substantially shorter than the distance between poles, a better fiber length is from about one-half to about equal to the distance between poles with fibers of about the same length as the magnetic field being preferred. If the fibers are significantly shorter than one-half the distance between the poles, magnetic coupling between fibers occurs and a stringing effect is observed which results in oriented fiber elements comprising two or more fibers end to end forming a magnetic circuit the length of the magnetic field. With fibers of preferred length, a pattern of fiber spacing is obtained wherein each fiber is separated from others. When using a plurality of magnetic fields, it is preferred to keep the distance between each magnetic field less than half the length of the fiber and less than the distance between the poles of an individual field. By maintaining the preferred distance, bridging of fibers between magnetic fields is avoided and the presence of fibers between the fields is eliminated. The above is also applicable to elements other than fibers; the largest dimension of the element is taken as fiber length.

Any geometric shape of magnetic material is utilizable in the process of the invention providing that the magnetic field is designed to accommodate the shape of the magnetic material. In general, the dimension of the material should be a significant proportion of the distance between poles. The magnetic material may be in the form of squares, cubes, flakes, discs, plates, fibers or the like. Preferably the smallest dimension of the magnetic material is less than half the largest dimension. It is desirable that the magnetic fields be approximately the same size as the material to be arranged. By varying the design of the magnetic fields, composites with magnetic material disposed upon the matrix in any desired geometric pattern can be obtained. The invention is particularly advantageous for making composites having aesthetic qualities. The possible arrangements of numbers of individual magnets is virtually unlimited and therefore many predetermined arrangements of magnetic material are possible. Interesting arrangements of magnetic material may be obtained by using superimposed sheets of material containing a plurality of band-like poles as described above and varying the angle at which the band-like poles of the individual sheets intersect.

In order to obtain a predetermined geometric pattern in which individual magnetic fibers are separated one from another, the rate at which the fiber is introduced into a magnetic field should be controlled so that the fiber population per unit area does not exceed the limit above which separation no longer takes place. A convenient means for controlling the amount of fiber is to spread the fibers upon a surface in essentially a monolayer. As long as essentially a monolayer is maintained, the fiber population is not critical. An example of a satisfactory fiber population employing one-eighth inch fibers fed to a plurality of one-eighth inch magnetic fields spaced about one-sixteenth inch apart is a monolayer containing from about 50 to about 250 fibers per square inch.

For the preparation of vulcanized composites any vulcanizable elastomer having sufficient unsaturation to be sulfur-vulcanizable is suitable in the practice of the invention. Natural rubber, synthetic rubbers or mixtures thereof are suitable. Both homopolymers or copolymers may be used. For example, polymers of butadiene, isoprene, chloroprene or isobutylene; and copolymers of isobutadiene with styrene, acrylonitrile, or chloroprene; and ethylene-propylene terpolymers containing sufficient diene monomer to introduce sufficient unsaturation to yield a sulfur-vulcanizable elastomer. Some elastomers may not inherently have sufficient adhesion properties to adhere to the fibers. The deficiency may be overcome by addition of known tackifying agents many of which are commercially available. Commonly used tackifying agents which are suitable in the practice of this invention are phenolic resins, phenol-aldehyde resins, terpene phenolic resins, amine-aldehyde resins, rosin and rosin derivatives.

The matrix is not necessarily vulcanizable and the invention may be practiced with thermosetting plastics or resins as the matrix phase. Examples of suitable thermosetting plastics are shown in the 50th Edition of the Handbook of Chemistry and Physics at pages C-771-774 which examples are incorporatd herein by reference. It will be appreciated that the invention may be applied to the manufacture of three phase composites which comprise fiber attached to an adhesive film deposited upon a support material, for example thin plastic sheets possessing no intrinsic surface tack. Where the support material possesses no intrinsic surface tack, as adhesive film thereon may serve as the transfer agent to hold the array of magnetic material. The technique is advantageous where the preparation of laminates is desired containing one or more layers of non-tacky material on one or more discontinuous fiber reinforced layers.

The size of the fiber may be varied substantially and still be suitable for the purpose of this invention. Generally, the fiber length is considerably greater than its diameter. The ratio of length to diameter is usually at least 10/1 but may be as great as 300/1. Normally, the fiber length is from one-sixteenth to 2 inches and the fiber diameter is less than 0.05 inches. The meaning of the term fiber according to this invention includes monofilaments and stranded filaments.

The strength of the magnetic field may vary over wide limits in the practice of this invention. The selection of the optimum magnetic field strength is dependent upon the force required to move the fiber from its random position when exposed to the field to a position parallel to the magnetic field and the adhesive strength of the matrix which contacts the oriented fibers and transfers them out of the magnetic field which strength must be greater than the field strength. The magnetic field must be able to overcome gravitational and frictional forces which tend to hinder the movement of the fiber in the magnetic field. Methods for obtaining magnetic fields with different field strengths are well known. Although for illustrative purpose permanent magnets have been used, electromagnets are suitable for the invention and in some cases are advantageous.

Any fiber capable of being attracted to a magnet, herein called magnetic fiber, is suitable for the practice of this invention. Thus, any magnetizable metal fiber is satisfactory, for example, fibers of iron, steel, cobalt, nickel or alloys thereof. Other materials may be present in alloys or as discrete material providing that the other material is not present in sufficient quantity to destroy the magnetic property of the fiber. Examples of other materials which may be present are brass, copper, zinc, lead, aluminum, carbon, silica, chromium and oxides thereof. In special applications, ferrite fibers may be used; illustrative materials from which ferrite fibers may be made either alone or in combination are $MnFe_2O_4$, $ZnFe_2O_4$ and $NiFe_2O_4$.

Synthetic textile fibers such as polyester, rayon and nylon as well as natural fibers such as cotton or other cellulose fibers are suitable provided the fibers are coated with a magnetic material. Inorganic fibers such as boron fibers and glass fibers may also be coated and used. Known techniques for coating fibers are satisfactory. For example, the fibers are sprayed with a coating containing magnetic material, for example, magnetic iron oxide $Fe_3O_4$ or Cobalt oxide $Co_2O_3$ dispersed in nitro-cellulose lacquer. Upon evaporation of the solvent and drying of the lacquer, fibers coated with magnetic material are obtained. Alternatively, the synthetic fibers may be produced having magnetic material dispersed therein. Magnetic materials are dispersed within the textile spinning solution so that when the spinning solution is passed through the spinnerets, the textile filaments are formed containing magnetic materials throughout the body of the filament. The filaments are then cut to the desired fiber length.

In the preparation of rubber-fiber composites it may be desirable to add adjuvants, either to the rubber, to the fiber or both, which increase the fiber to rubber adhesion in the vulcanized product. The fibers may be coated with bonding agents prior to orientation or certain bonding agents developed for addition to the rubber matrix may be incorporated into the vulcanizable composition of the matrix material. The conventional bonding agents known to adhere fiber to rubber may be used. The selection of the proper bonding agent is within the skill of those familiar with fiber-rubber adhesion and depends upon the nature of the fiber.

EXAMPLES

A vulcanizable composition is prepared by mixing the following ingredients: 50 parts smoked sheets natural rubber, 68.8 parts styrene-butadiene rubber 1712, 50 parts furnace carbon black, 3.0 parts zinc oxide, 2.0 parts stearic acid, 2.0 parts sulfur, 0.5 parts tert-butyl-2-benzothiazolesulfenamide and 10 parts calcium oxide, all parts by weight. A portion of the composition is formed into sheets about one-sixteenth inch thick by passing through a rubber mill. A section of the sheet is the matrix material used for forming a composite as described below.

Bekaert steel fiber about one-eighth inch in length and 0.0059 inches in diameter are randomly disposed upon a sheet of non-magnetic material. The sheet carrying the randomly disposed fiber is passed over a plurality of magnetic fields parallel to the direction of the magnetic fields. The magnetic fields comprise barium ferrite dispersed in polyvinyl chloride sheets and magnetized in a plurality of band-like magnetic fields. The magnetic sheet material is manufactured by the B. F. Goodrich Company, Akron, Ohio. The length of each primary magnetic field is about one-eighth inch and the distance between fields is about one-sixteenth inch. The sheet carrying the fibers is moved over the magnetic fields whereupon the fibers orient and position themselves in rows corresponding to the relative position of each magnetic field. The fibers within the magnetic field are arranged in a regular pattern approximately as illustrated in FIG. 4a. On the average there are 20 to 22 fibers per inch in each row. A sheet of the vulcanizable composition described above is pressed against the fibers arrayed in regular pattern and then removed from the vicinity of the magnetic fields. All of the fibers are transferred to the matrix material and maintain the spatial relationship which was established in the magnetic fields.

A laminate is built from a strip of composite comprising the above described rubber matrix and aforesaid metal fibers by tightly rolling the strip on itself into a solid cylindrical body comprising a multiple layer laminate. The fiber reinforced cylindrical body is open cured at 153°C for 45 minutes to produce a reinforced rubber rope. Laminated belts are formed by joining the ends of a suitable length of the aforesaid uncured cylindrical body and curing as before. It is preferable, when forming a laminate by rolling a sheet of composite, to roll the sheet on a bias so that offsetting arrangement of adjacent layers of fiber are obtained; which arrangement results in better reinforcement and consequently stronger finished articles.

The above experiment is repeated using aluminum-steel alloy fiber prepared as described in British patent no. 1,153,577, May 29, 1969 and cut into about one-eighth inch lengths. The fiber diameter is about 0.003 inches. The same regular pattern of fiber arrangement is obtained with the average of 24 to 26 fibers per inch in each row.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method for producing composites which comprises reducing discontinuous magnetic material to spatial order by the force of a magnetic field, transferring the ordered material out of the magnetic field to a matrix surface in parallel relationship to the surface by the application of adhesive forces sufficient to overcome the force of the magnetic field and to maintain the spatial position in the matrix.

2. A method of claim 1 wherein the magnetic material is plates or flakes.

3. A method of claim 1 wherein the magnetic material is fiber which is introduced into the magnetic field in amount controlled to obtain the spatial order and the ordered material is transferred to a matrix.

4. A method of claim 3 wherein the magnetic material is spread upon a surface prior to introduction to the magnetic field.

5. A method of claim 3 wherein the matrix material is sulfur vulcanizable diene rubber.

6. A method of claim 5 wherein the composite is heated to effect vulcanization.

7. A method of claim 3 wherein the magnetic material is introduced to a plurality of magnetic fields.

8. A method for producing reinforced composites which comprises introducing an amount of reinforcing magnetic fiber spread upon a surface to a plurality of magnetic fields to position the fiber, transferring the fiber out of the magnetic fields to a matrix surface in parallel relationship to the surface and maintaining the spatial position of the ordered fiber essentially by impressing the fiber into the matrix.

9. A method of claim 8 wherein the fiber length is one-sixteenth to 2 inches and the fiber diameter is less than 0.05 inches.

10. A method of claim 8 wherein the fiber is selected from the group consisting of iron, steel, stainless steel, brass-plated steel or aluminum-steel alloy.

11. A method of claim 8 wherein the fiber is essentially in a monolayer.

* * * * *